United States Patent Office 3,786,086
Patented Jan. 15, 1974

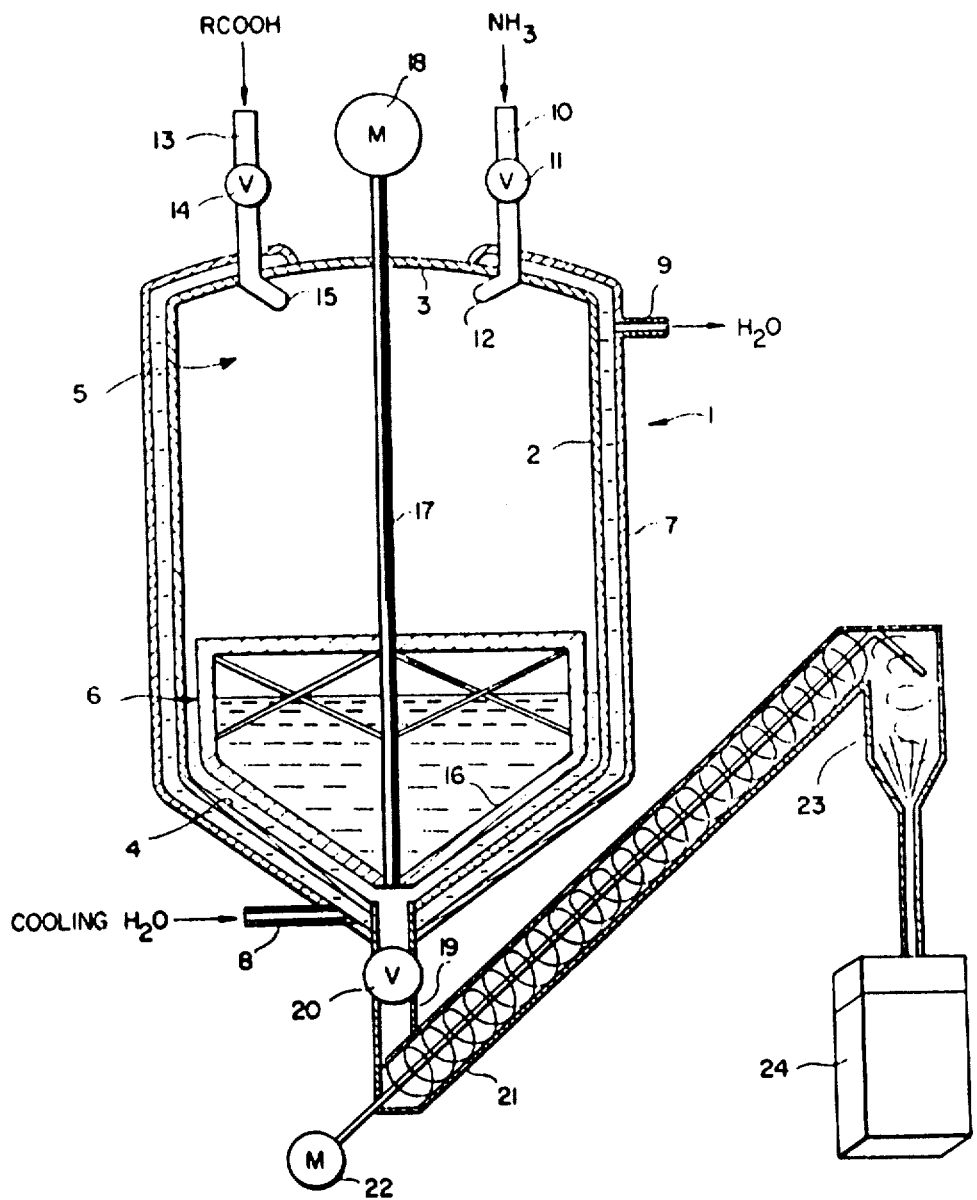

3,786,086
PROCESS FOR PREPARING AMMONIUM SALTS OF ALKANOIC ACIDS
Ebbe R. Skov, Middletown, Roderick B. Judge, Montclair, and Goeffrey Hemphill, Manasquan, N.J., assignors to W. R. Grace & Co., New York, N.Y.
Filed Nov. 7, 1972, Ser. No. 304,462
Int. Cl. C07c 51/52
U.S. Cl. 260—540                                    15 Claims

ABSTRACT OF THE DISCLOSURE

A free flowing particulate solid ammonium salt of an alkanoic acid having 1-10 carbon atoms is prepared by spraying the alkanoic acid into an atmosphere of ammonia vapor in a reaction zone in a manner to prevent the acid spray from contacting the internal surface of the reaction zone.

BACKGROUND OF THE INVENTION

This invention is in the field of ammonium salts of alkanoic acids having 1-10 carbon atoms. Said invention is a process for preparing said salts in essentially quantitative yield based on the reactants consumed. The product is a highly (or substantially) pure, free flowing, particulate, anhydrous solid salt having the formula RCOONH$_4$ where R is hydrogen or an alkyl group having 1-9 carbon atoms.

A prior art method for preparing such salts in essentially pure anhydrous form was described by Zuffanti (J. Am. Chem. Soc., 1941, 63, 3123-3124). Zuffanti prepared a salt by spraying a very small amount (about 0.5 cc.) of a liquid anhydrous alkanoic acid on the wall of a U-tube while passing anhydrous ammonia vapor through the tube. Although the Zuffanti method produces ammonium salts of high purity, the product is not free flowing and it adheres to the wall of the U-tube. The prior art method does not produce a free flowing product, and said method is not suited for commercial operation on either a batch or continuous basis.

SUMMARY OF THE INVENTION

In summary, this invention is directed to an improvement in a process for preparing a solid ammonium salt of a liquid anhydrous alkanoic acid having 1-10 carbon atoms per molecule comprising contacting a spray of said liquid anhydrous alkanoic acid with anhydrous ammonia vapor in a reaction zone having an external surface and an internal surface (including a side wall), an upper portion, and a lower portion and recovering the resulting solid ammonium salt of said liquid alkanoic acid, the improvement comprising: filling the reaction zone with anhydrous ammonia vapor by vaporizing liquid anhydrous ammonia therein and spraying particles of said liquid anhydrous alkanoic acid into the reaction zone without contact between the liquid anhydrous alkanoic acid particles and the internal surface (especially the side wall) of the reaction zone to produce a free flowing particulate solid product consisting essentially of said ammonium salt of said liquid anhydrous alkanoic acid.

BRIEF DESCRIPTION OF THE DRAWING

The drawing shows, in section with parts cut away, a preferred apparatus for conducting the process of the instant invention.

DESCRIPTION OF PREFERRED EMBODIMENTS

In preferred embodiments of the process of the above summary:

(1) The alkanoic acid has 4-5 carbon atoms.
(2) The particles of liquid anhydrous alkanoic acid are of a size to produce particles of said free flowing ammonium salt of said liquid anhydrous alkanoic acid which pass a 100 mesh screen and the process is operated in a fully continuous manner.
(3) The liquid anhydrous alkanoic acid is isobutyric acid or valeric acid.

In another preferred embodiment ("Embodiment A") this invention is directed to an improvement in a process for preparing a solid ammonium salt of a liquid anhydrous alkanoic acid having 1-10 carbon atoms per molecule comprising contacting a spray of said liquid anhydrous alkanoic acid with anhydrous ammonia vapor in a reaction zone having an external surface, an internal surface, a side wall, a top, a bottom, an upper portion, and a lower portion and recovering the resulting solid ammonium salt of said liquid alkanoic acid, the improvement comprising:

(a) filling the reaction zone with anhydrous ammonia vapor by feeding liquid anhydrous ammonia into the upper portion of the reaction zone via a spray nozzle and vaporizing said ammonia in the upper portion of said zone; and
(b) spraying particles of said liquid anhydrous alkanoic acid into the upper portion of the reaction zone and preventing contact between the liquid anhydrous alkanoic acid particles and the internal surface of the reaction zone to produce a free flowing particulate solid product consisting essentially of said ammonium salt of said liquid anhydrous alkanoic acid.

In especially preferred embodiments of the process of Embodiment A, supra:

(1) The particles of liquid anhydrous alkanoic acid are of a size to produce particles of said free flowing ammonium salt of said liquid anhydrous alkanoic acid which pass a 100 mesh screen.
(2) The liquid anhydrous acid is isobutyric acid or valeric acid.
(3) The process is operated in a fully continuous manner.
(4) The reaction zone is a jacketed reaction zone having a heat exchange medium circulating through the jacket. Water is a preferred heat exchange medium.

In another preferred embodiment ("Embodiment B") this invention is directed to an improvement in a process for preparing a solid ammonium salt of a liquid anhydrous alkanoic acid having 1-10 carbon atoms per molecule comprising contacting a spray consisting essentially of said liquid anhydrous alkanoic acid with anhydrous ammonia vapor in a first reaction zone having an external surface, an internal surface, a side wall, a top, a bottom, an upper portion, and a lower portion and recovering the resulting solid ammonium salt of said liquid alkanoic acid, the improvement comprising:

(a) forming a liquid anhydrous mixture consisting essentially of an anhydrous solution of about 30-60% (more preferably about 40-50%) of the ammonium salt of said liquid anhydrous alkanoic acid dissolved in said liquid anhydrous alkanoic acid by contacting anhydrous ammonia and said liquid anhydrous acid in a second reaction zone; and
(b) filling the first reaction zone with anhydrous ammonia vapor by spraying liquid anhydrous ammonia into the upper portion of said first reaction zone and vaporizing said ammonia therein; and
(c) spraying particles of the liquid anhydrous mixture into the upper portion of the first reaction zone without contact between the liquid anhydrous mixture and the internal surface of the first reaction zone to produce said solid ammonium salt of said liquid alkanoic acid in the form of a free flowing particulate solid.

In especially preferred embodiments of the process as set forth in Embodiment B, supra:

(1) The particles of said liquid anhydrous mixture are of a size that the particles of said solid, free flowing, particulate ammonium salt of said liquid anhydrous alkanoic acid pass a 100 mesh screen.

(2) The liquid anhydrous alkanoic acid is isobutyric acid and the salt is ammonium isobutyrate.

(3) The process is operated in a fully continuous manner.

(4) The first reaction zone is a jacketed reaction zone having a heat exchange medium circulating through the jacket. Water is an especially preferred heat exchange medium.

(5) The liquid anhydrous alkanoic acid is valeric acid and the salt is ammonium valerate.

DETAILED DESCRIPTION OF THE INVENTION

Where using the process of this invention it is important that the above-mentioned liquid anhydrous alkanoic acid or the above-mentioned liquid anhydrous mixture be sprayed into the reaction zone in such a manner that the spray particles do not contact the side wall of the reaction zone internal surface (including the side wall) because such contact will result in the build up of a coating of the ammonium salt of the liquid anhydrous alkanoic acid on wall. This will produce product which adheres to the wall and which is neither particulate nor free flowing and which must ultimately be scraped from the wall.

We have found that best results are obtained where the particles of alkanoic acid spray (or the particles of the above-mentioned liquid anhydrous mixture spray) are of such size that the particles of solid anhydrous ammonium salt which forms as the spray particles react with the anhydrous ammonia vapor will pass about a 100 mesh screen. Further where said acid (or anhydrous mixture) spray is of such size that the product particles are retained on a 100 mesh screen the product is impure (i.e., it contains more than 0.2% free (unreacted) alkanoic acid).

We have also found that best results are obtained where the liquid anhydrous ammonia is fed into the reaction zone as a fine spray so that the ammonia is promptly vaporized. If droplets of liquid ammonia fall onto the solid free flowing particulate product (the ammonium salt of the liquid anhydrous alkanoic acid) in the lower portion (or lower section) of the reaction zone the particles of said salt are converted into rock hard spherical noodles (or lumps or chunks) which weigh from about 0.5 g. to 100 g. or more.

We have also found that feeding the anhydrous ammonia into the reaction zone as liquid anhydrous ammonia and vaporizing said liquid anhydrous ammonia in the reaction zone (reactor) permits a throughput (conversion per hour) which is five times greater than that attainable where using the same reaction zone and feeding anhydrous ammonia vapor per se (rather than liquid anhydrous ammonia) into said reaction zone.

The stoichiometry of the exothermic reaction resulting in the formation of the ammonium salt of an alkanoic acid in our process is represented by the following equation:

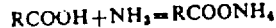

$$RCOOH + NH_3 = RCOONH_4$$

where R is hydrogen or an alkyl group having 1-9 carbon atoms.

We have found that in order to obtain a pure product it is necessary to maintain at least a stoichiometric quantity of anhydrous ammonia vapor in the reaction zone (an excess of ammonia does no harm). We prefer to do this by providing an atmosphere of ammonia (at least 90% $NH_3$) in the reaction zone before starting a run and then supplying the ammonia as liquid anhydrous ammonia at a rate which will provide a mole of anhydrous ammonia vapor for every mole of free (unreacted) alkanoic acid sprayed into the reaction zone. If insufficient ammonia is present the product will be contaminated with free (unreacted) alkanoic acid.

While we prefer to operate our process at about atmospheric pressure (i.e., with a pressure of about 760 mm. of mercury absolute in the reaction zone) we have obtained excellent results at pressures ranging from about 500–2000 mm. of mercury absolute.

The process of our invention can be operated as a batch process but it is more convenient to operate it as a fully continuous process.

Where operating as a batch process a quantity of product is permitted to accumulate in the lower portion of the reaction zone, acid feed and ammonia feed are discontinued, most of the product is removed, and a new run is started. Retaining some product in the reaction zone prevents the escape of appreciable quantities of free (unreacted) ammonia.

Where operating in a continuous manner a quantity of product is permitted to accumulate in the lower portion of the reaction zone, then, while continuing to feed liquid anhydrous alkanoic acid and liquid anhydrous ammonia into the reaction zone, product is removed from the reaction zone and recovered at substantially the same rate that it (said product) is formed. This procedure retains a quantity of free flowing anhydrous particulate product in the lower portion of the reaction zone at all times to prevent any substantial quantity of unreacted ammonia from escaping from the reaction zone as product is removed therefrom.

A more comprehensive understanding of our invention can be obtained from the following detailed description of a preferred method for operating said process involving the use of apparatus disclosed in the drawing—said drawing showing a schematic cross section view of a preferred apparatus.

The apparatus comprises a reaction zone (or reactor) shown generally at 1 in which the product ammonium salt is formed. The product ammonium salt passes via valve 20 (e.g., a gate valve, plug valve, or the like) and line 19 to conveyor means 21 (e.g., a screw conveyor, a belt conveyor, a cup conveyor, or the like) to bagging means 23 from which is passed to a bag or package 24. (The bag is not part of the apparatus.) Motor 22 drives conveyor means 21.

The reaction zone has a side wall 2, a top 3, a bottom 4, an upper portion 5, and a lower portion 6. We generally prefer to use a jacketed reaction zone. Said jacket is shown at 7. A liquid cooling medium enters the jacket via line 8 and exits the jacket via line 9. Liquid anhydrous ammonia enters the reaction zone via line 10, valve 11, and spray nozzle 12. We generally prefer to feed the ammonia via a hollow cone nozzle, but have obtained excellent results with a solid cone nozzle, a fan nozzle, a rotating nozzle, and an impact nozzle. The ammonia which enters as an anhydrous liquid quickly vaporizes in the reaction zone to fill said zone with anhydrous ammonia vapor.

The liquid anhydrous alkanoic acid (or, where using Embodiment B or an embodiment thereunder, the liquid anhydrous mixture consisting essentially of an anhydrous solution of the desired ammonium salt of the liquid anhydrous alkanoic acid dissolved in said liquid anhydrous alkanoic acid) enters the reaction zone via line 13, valve 14, and spray nozzle 15. The spray nozzle is so oriented that particles of the spray do not come into contact with an inner surface of the reaction zone (we feed the acid or acid mixture into the system in such a manner that all the acid in the acid feed has been converted to the desired ammonium salt before striking any surface within the reaction zone). We prefer to feed the alkanoic acid (or alkanoic acid-containing mixture) into the reaction zone via a hollow cone nozzle but we have obtained excellent results with a solid cone nozzle, a fan nozzle, a rotating nozzle, and an impact nozzle.

Within the lower portion 6 of the reaction zone is an agitator (or scrapper) 16 preferably an anchor type agitator which is preferably positioned about ¼–½ inch from the side wall 2 and bottom 4 of the reaction zone. Agitator shaft 17 conveys energy from motor 18 to drive agitator 16.

Valve 20 is so operated as to prevent the accumulation of too much product in the reaction zone and at the same time to prevent the escape of appreciable amounts of free ammonia from said zone.

When starting a run we purge the reaction zone with ammonia until the atmosphere within the reaction zone is at least about 90% (preferably about 95–100%) ammonia vapor and then spray feeding alkanoic acid or the above mentioned liquid alkanoic acid-contacting mixture into the upper portion of the reaction zone. Liquid anhydrous ammonia is spray fed into the upper portion of the reaction zone simultaneously with the acid (supplying a mole of ammonia per mole of free (unreacted) acid), thereby to maintain an atmosphere of ammonia in the reaction zone.

The reaction between the ammonia and the alkanoic acid is exothermic. We have found that we can operate our process with excellent results when the temperature within the reaction zone is about 100–235° F.; however, we prefer to operate within a range of about 160–200° F. We prefer to control the temperature by passing a cooling medium through the jacket which, as noted supra, surrounds the reaction zone. Temperature control can also be effected to some extent by the rate at which we form the desired ammonium salt (e.g., by the rate at which the reactants are fed into the reaction zone). We prefer to direct the acid spray at a point just below the point at which the ammonia enters the reaction zone to insure good contact between the acid and the ammonia, thereby to prevent unreacted acid from contacting an internal surface of the reaction zone.

When doing this we get instant crystallization of the sprayed (or fogged) alkanoic acid. The effect is somewhat like a snow storm and the product is a free flowing, anhydrous, particulate solid consisting essentially of the ammonium salt of the acid.

The instant invention will be better understood by referring to the following specific but nonlimiting examples. It is understood that said invention is not limited by these examples which are offered merely as illustrations; it is also understood that modifications can be made without departing from the spirit and scope of the invention.

Example 1

A reaction zone (capacity about 4,000 gallons) of the type shown in the drawing and described supra was purged with ammonia (fed in as liquid anhydrous ammonia and vaporized in the reaction zone) to form an atmosphere therein which analyzed 95% $NH_3$. The operation was conducted at atmospheric pressure (760 mm. of mercury absolute).

The exit valve (20 in the drawing) was closed and liquid anhydrous isobutyric was fed into the reaction zone as a fine spray via line 13, valve 14, and acid spray nozzle 15 while continuing to feed liquid anhydrous ammonia into the reaction zone via ammonia feed line 10, ammonia pressure control valve 11, and ammonia spray nozzle 12. The isobutyric acid feed rate was 440 pounds (5 pound molecular weights) per hour and the ammonia feed rate was 85 pounds (5 pound molecular weights) per hour. The isobutyric acid entering the reaction zone had a temperature of 21° C. and the ammonia entering said zone had a temperature of 23° C. Isobutyric acid nozzle 15 was so oriented that the liquid anhydrous isobutyric acid spray did not contact the internal surface of the reaction zone.

Drive motor 18 was started (when the acid feed was begun) to rotate agitator 16. After a layer of product solid, free flowing, particulate, anhydrous ammonium isobutyrate had accumulated in lower portion (or section) 6 of the reaction zone motor 22 was started and valve 20 was partially opened to permit the salt (the aforesaid ammonium isobutyrate) to exit from reaction zone 1 via valve 20 and line 19 at substantially the same rate it (said salt) was formed. The salt was conveyed by conveyor 21 to packaging (or bagging means) 23 and then bagged in 50 pound bags.

A representative sample of the bagged product was taken and analyzed. It was found to be pure anhydrous, solid free flowing, particulate, anhydrous ammonium isobutyrate analyzing 99.5% ammonium isobutyrate, 0.1% free (unreacted) isobutyric acid, and 0.3% $H_2O$; said product passed a 100 mesh U.S. standard screen.

During the run which lasted for 8 hours cooling water (entering temperature 22° C.) was passed through jacket 7 at a rate to keep the temperature within the reaction zone within a range of 175–185° F. (ca. 80–85° C.).

The temperature at which the isobutyric acid is fed into the reaction zone can be varied over a wide range and is not critical. Excellent results were obtained when the liquid anhydrous isobutyric acid was fed at 3° C., 23° C., and 40° C. Excellent results were also obtained at temperatures below 3° C. and above 40° C.

The liquid anhydrous ammonia is generally fed at its storage temperature which varies from about 5° C. to 30° C. depending on the season. However excellent results have been obtained at temperatures below 5° C. and above 30° C.

A number of runs were made using the general procedure of Example 1 but maintaining the temperature within the reaction zone at: (a) 100–125° F.; (b) 130–160° F.; (c) 165–180° F.; and (d) 185–200° F. In each instance high quality, pure, solid, anhydrous, free flowing ammonium isobutyrate passing a 100 mesh screen and analyzing at least 99.5% ammonium isobutyrate and not more than 0.2% free (unreacted) isobutyric acid and up to 0.3% $H_2O$ was obtained.

In another series of runs the general procedure of Example 1 was repeated; however, in these runs the isobutyric acid was replaced with anhydrous: (a) formic acid; (b) acetic acid; (c) propionic acid; (d) normal butyric acid was replaced with anhydrous: (a) formic each instance the liquid anhydrous acid was fed into the reaction zone at a rate of 5 pound moles per hour and the ammonia was fed into said zone at a rate of 5 pounds per hour.

In each instance the product was a pure, solid, anhydrous, free flowing particulate ammonium salt of the acid used—said salt passing a 100 mesh screen and analyzing at least 99.5% ammonium salt of the acid used, not more than 0.2% free acid and up to 0.3% $H_2O$. Similar results are obtained with $C_7$, $C_8$, $C_9$, and $C_{10}$ alkanoic acids (i.e., alkanoic acids having 7, 8, 9, and 10 carbon atoms).

Two additional runs were made using the general procedure of Example 1. However, in one instance the pressure within the reaction zone was 500 mm. of mercury absolute and in the other the pressure was 2000 mm. of mercury absolute. The results of the run and products obtained in these runs were indistinguishable from that obtained in Example 1.

Example 2

The general procedure of Example 1 was repeated; however, in this instance the procedure was modified by replacing the isobutyric acid fed into the reaction zone used in Example 1 (a first reaction zone) with a liquid anhydrous mixture (a solution of anhydrous ammonium isobutyrate dissolved in liquid anhydrous isobutyric acid). Said solution analyzed 60% isobutyric acid and 40% ammonium isobutyrate. Said solution was prepared by reacting ammonia and isobutyric acid in a reactor (a second reaction zone) having an agitator and heat exchange coils (if desired a jacketed reactor can be used). Liquid anhydrous isobutyric acid was placed in the second reaction zone and liquid ammonia was fed into said second reaction zone while agitating the acid (and the resulting solution) in said zone. A heat exchange medium (e.g., water, or the like) was circulated through the cooling coils to cool the resulting solution to the desired temperature range (e.g., 100–130° C. which has been found to give excellent results).

The temperature of the aforesaid anhydrous mixture (said anhydrous solution of ammonium isobutyrate in anhydrous isobutyric acid) was adjusted to about 110° F. by passing said anhydrous mixture through a heat exchanger. The aforesaid anhydrous mixture was then fed into the reaction zone used in Example 1 (the first reaction zone) at a temperature of about 110° F. and at a rate to provide 5 pound moles of isobutyric acid per hour while ammonia was fed into said first reaction zone at a rate to provide 5 pound moles of ammonia per hour. The ammonia feed was supplied an anhydrous liquid ammonia at 25° C. The product of this run was indistinguishable from that of Example 1.

Where runs are made using the general procedure of Example 2 except that: (a) the anhydrous isobutyric acid is replaced with a second alkanoic acid having 1–10 carbon atoms; and (b) the anhydrous solution of ammonium isobutyrate in isobutyric is replaced with an anhydrous solution of the ammonium salt of the second alkanoic acid dissolved in the second alkanoic acid, the results are as in Example 2 except that the final product is the free flowing particulate ammonium salt of the second alkanoic acid. The final product passes a 100 mesh screen and analyzes about 0.2% said alkanoic acid (as free acid) and not more than 0.3% $H_2O$—the remainder (99.5%) is said ammonium salt of said second alkanoic acid.

As used herein the term "percent (%)" means parts per hundred and "parts" means parts by weight.

The term "mesh" as applied to particle size means U.S. standard.

The term "conversion" means one pass yield.

An anhydrous or substantially anhydrous ammonium salt of an alkanoic acid having 1–10 carbon atoms is an ammonium salt of such acid analyzing less than about 0.4% $H_2O$.

Ammonium salts of alkanoic acids prepared according to the process of our invention are useful for retarding or preventing the growth of mildew in silage and the like. It has been found that little or no mildew forms on silage prepared and stored in either an underground (trench type) silo or an aboveground (tower type) silo if such ammonium salt (or a mixture of such ammonium salts) is applied to the silage according to the general procedure of U.S. patent application Ser. No. 76,224, filed Sept. 28, 1970 (Lepore et al.) which is assigned to W. R. Grace & Co.

Ammonium salts of alkanoic acids having 1–10 carbon atoms prepared according to the method of this invention have been used with excellent results to prevent mildew from growing on moist seeds (which will be planted). Such salt is applied at the moist seeds at a rate to provide about 0.25–2 pounds of salt per 100 pounds of moist seeds. When applied at this rate the salt does not interfere with the germination of the seeds and actually supplies some nitrogen fertilizer.

We claim:

1. In a process for preparing a solid ammonium salt of a liquid anhydrous alkanoic acid having 1–10 carbon atoms per molecule comprising contacting a spray of said liquid anhydrous alkanoic acid with anhydrous ammonia vapor in a reaction zone having an internal surface, an upper portion, and a lower portion and recovering the resulting solid ammonium salt of said liquid alkanoic acid, the improvement comprising; filling the reaction zone with at least a stoichiometric amount of anhydrous ammonia vapor by vaporizing liquid anhydrous ammonia in the upper portion thereof and spraying particles of said liquid anhydrous alkanoic acid into the upper portion of the reaction zone while maintaining the temperature within said zone at 100–235° F. without contact between the liquid anhydrous alkanoic acid particles and the internal surface of the reaction zone to produce a free flowing particulate solid product consisting essentially of said ammonium salt of said liquid anhydrous alkanoic acid.

2. The process of claim 1 in which the alkanoic acid has 4 or 5 carbon atoms.

3. The process of claim 1 in which the particles of liquid anhydrous alkanoic acid are of a size to produce particles of said free flowing ammonium salt of said liquid anhydrous alkanoic acid which pass a 100 mesh screen and the process is operated in a fully continuous manner.

4. The process of claim 1 in which the liquid anhydrous alkanoic acid is isobutyric acid or valeric acid.

5. In a process for preparing a solid ammonium salt of a liquid anhydrous alkanoic acid having 1–10 carbon atoms per molecule comprising contacting a spray of said liquid anhydrous alkanoic acid with anhydrous ammonia vapor in a reaction zone having an external surface, an internal surface, a side wall, a top, a bottom, an upper portion, and a lower portion and recovering the resulting solid ammonium salt of said liquid alkanoic acid, the improvement comprising:
  (a) filling the reaction zone with anhydrous ammonia vapor by feeding at least a stoichiometric amount of liquid anhydrous ammonia into the upper portion of the reaction zone and vaporizing said ammonia therein; and
  (b) spraying particles of said liquid anhydrous alkanoic acid into the upper portion of the reaction zone while maintaining the temperature within said zone at 100–235° F. and preventing contact between the liquid anhydrous alkanoic acid particles and the internal surface of the reaction zone to produce a free flowing particulate solid product consisting essentially of said ammonium salt of said liquid anhydrous alkanoic acid.

6. The process of claim 5 in which the particles of liquid anhydrous alkanoic acid are of a size to produce particles of said free flowing ammonium salt of said liquid anhydrous alkanoic acid which pass a 100 mesh screen.

7. The process of claim 5 in which the liquid anhydrous alkanoic acid is isobutyric acid or valeric acid.

8. The process of claim 5 wherein the process is operated in a fully continuous manner.

9. The process of claim 5 in which the reaction zone is a jacketed reaction zone having a heat exchange medium circulating through the jacket.

10. In a process for preparing a solid ammonium salt of a liquid anhydrous alkanoic acid having 1–10 carbon atoms per molecule comprising contacting a spray consisting essentially of said liquid anhydrous alkanoic acid with anhydrous ammonia vapor in a first reaction zone having an external surface, an internal surface, a side wall, a top, a bottom, an upper portion, and a lower portion and recovering the resulting solid ammonium salt of said liquid alkanoic acid, the improvement comprising;
  (a) forming a liquid anhydrous mixture consisting essentially of an anhydrous solution of about 45–55% of the ammonium salt of said liquid anhydrous alkanoic acid dissolved in said liquid anhydrous alkanoic acid by contacting anhydrous ammonia and said liquid anhydrous alkanoic acid in a second reaction zone;
  (b) filling the first reaction zone with anhydrous ammonia vapor by feeding at least a stoichiometric amount of liquid anhydrous ammonia into the upper portion of said first reaction zone and vaporizing said ammonia therein; and
  (c) spraying particles of said liquid anhydrous mixture into the upper portion of the first reaction zone while maintaining the temperature within said first reaction zone at 100–235° F. without contact between said liquid anhydrous mixture and the internal surface of the reaction zone to produce said solid ammonium salt of said liquid alkanoic acid in the form of a free flowing particulate solid consisting essentially of said ammonium salt.

11. The process of claim 10 in which the particles of said liquid anhydrous mixture are of a size that the particles of said solid, free flowing, particulate ammonium salt of said liquid anhydrous alkanoic acid pass a 100 mesh screen.

12. The process of claim 10 in which the liquid anhydrous alkanoic acid is isobutyric and the salt is ammonium isobutyrate.

13. The process of claim 10 in which the process is operated in a fully continuous manner.

14. The process of claim 10 in which the first reaction zone is a jacketed reaction zone having a heat exchange medium circulating through the jacket.

15. The process of claim 10 in which the alkanoic acid is valeric acid and the salt is ammonium valerate.

References Cited
UNITED STATES PATENTS 3,123,632  3/1964  Katschmann _____ 260—540

OTHER REFERENCES

Zuffanti, J. A. C. S., 1941, 63: 3123-24.

VIVIAN GARNER, Primary Examiner

U.S. Cl. X.R.

260—404, 541, 542